May 17, 1966 T. E. McCULLOUGH ETAL 3,252,129
METHOD OF DETERMINING THE TRAVEL TIME OF A SEISMIC SIGNAL
Filed Dec. 27, 1962 3 Sheets-Sheet 1

INVENTORS
Thomas E. McCullough
Lawrence Strickland

May 17, 1966  T. E. McCULLOUGH ETAL  3,252,129
METHOD OF DETERMINING THE TRAVEL TIME OF A SEISMIC SIGNAL
Filed Dec. 27, 1962  3 Sheets-Sheet 3

INVENTORS
Thomas E. McCullough
Lawrence Strickland

United States Patent Office 3,252,129
Patented May 17, 1966

3,252,129
METHOD OF DETERMINING THE TRAVEL TIME OF A SEISMIC SIGNAL
Thomas E. McCullough and Lawrence Strickland, Dallas, Tex., assignors to Texas Instruments Incorporated, Dallas, Tex., a corporation of Delaware
Filed Dec. 27, 1962, Ser. No. 247,592
2 Claims. (Cl. 340—15.5)

The present invention relates generally to a method of determining the travel time of a signal between spaced points in a medium, and more particularly relates to a method of determining the travel times between spaced points in a medium of multiple signals each originating simultaneously at one of said points.

A particular application of this method is the determination of the distances from a sonic source of reflecting or refracting interfaces in a medium when the sonic signal is reflected or refracted by the interfaces, and this application has peculiar importance in seismic prospecting and the searching for underwater objects.

It is common to use a sonic signal originating from a source and travelling through a medium for reflecting off objects and interfaces in the medium for determining the distances of the objects and interfaces from the source. A data reduction problem arises when a single sonic signal is originated at a source and is reflected from many distinct interfaces or objects situated in the medium each at a different distance from the source. The composite reflected signal comprising the several reflections is received and detected by a suitable transducer, and the electrical output thereof represents a combination of the several reflected signals. The reduction of this data to an interpretable record that distinguishes each reflection so that the respective distances of the reflecting interfaces from the source can be individually determined is considered as one of the more complex, if not the most complex problem in seismic prospecting. In this connection it should also be recognized that noise received by the transducer often impairs the ability to reduce the data accurately.

In view of the above it is an object of the invention to provide a method of determining the travel time of a signal between spaced points in a medium.

Another object is to provide a method of determining the travel times between spaced points in a medium of multiple signals each originating simultaneously at one of said points.

Yet another object is to provide a method of processing data associated with a detected complex sonic signal travelling in a medium and the reduction of data to an interpretable record.

Another object is to provide a greatly simplified method of processing data associated with a detected complex sonic signal travelling in a medium and the reduction of this data to an interpretable record.

Still another object is to provide a method according to the above objects wherein the noise detected with the sonic signal is reduced to an extent that it does not impair the accuracy of the record.

A more specific object is to provide a method of determining the travel times between a pair of spaced points, of multiple signals caused by reflections from interfaces in a medium, each of the reflected signals originating simultaneously from one of said points prior to reflection, wherein the processing of this complex data includes a method of reduction thereof to an interpretable record for determining individually the respective distances of the several interfaces from the source of origination of the sonic signal.

A still more specific object is to provide a method according to the last-mentioned object that has particular application to seismic prospecting.

Yet another object is to provide a seismic method according to the last-mentioned object wherein the phase imparted to the signals at the reflecting interfaces can be determined.

Other objects, features and advantages of the invention will become apparent from the following description when taken in conjunction with the appended claims and the attached drawing in which like reference numerals refer to like parts throughout the several figures, and in which:

Figure 1:
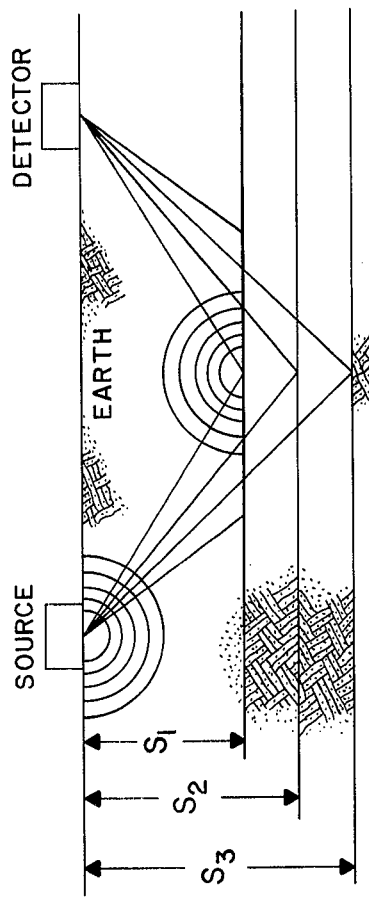
FIG. 1 is a sectional view of a geological location showing reflections of a seismic signal from several subsurface strata.

According to a broad aspect of the invention, a sonic signal whose frequency varies with time at a known rate is coupled to the medium in which it is to be transmitted. The frequency of the signal as a function of time is known and this function is non-repeating over its duration. The generated signal is transmitted through the medium and is ultimately detected by a receiver or transducer at a spaced location from its source of origination. Since most mediums transmit all of the frequencies comprising the sonic signal at approximately the same velocity, the dispersion characteristic of the medium in this respect may be neglected. Thus the frequency of the detected signal varies with time in the same manner and at the same rate as does the original signal, except that it is shifted or delayed in time by an amount equal to the travel time of the signal from the source to the point of detection.

A receiver detects and transduces the reflected or refracted signal into an electrical signal, and the electrical output of the receiver is processed to determine the time shift between the original signal and the received signal. The processing includes heterodyning (multiplying) the output signal (reflected wave) from the transducer with the original signal, or a signal the function of frequency with time of which is identical to the original signal. Because of the time delay between the reflected wave and the original signal, the heterodyning of the two will produce an upper sideband comprising a function whose instantaneous frequency is the addition of the instantaneous frequencies of the original and the reflected signal, and a lower sideband comprising a function whose instantaneous frequency is the difference of the instantaneous frequencies of the original and the reflected signals. The frequencies of the lower sideband components are constant since the original and reflected signals have identical characteristics and are simply delayed in time from each other. Therefore, the difference frequency is proportional to the total time of travel of the signal in the transmitting medium.

The heterodyned signal is now filtered to eliminate all frequency components except the lower sideband. The lower sideband is then processed to provide a frequency analysis of the components thereof, and this is accomplished by Fourier transforming the filtered output of the heterodyned signal. The frequency analysis yields amplitude peaks at frequencies corresponding to the various difference frequencies present in the lower sideband.

It will now become apparent that this process is particularly advantageous for simultaneously processing a composite received signal that, after heterodyning and filtering, has a lower sideband comprised of a multiple of distinct difference frequencies. For example, in seismic prospecting to which the method of this invention has particular application, a single sonic signal coupled into the earth is reflected, and often refracted, several times by different sub-surface interfaces. These phenomena produce at the location of detection of the transmitted signal a plurality of individual signals each identical in its frequency function with the original signal, except that each is time shifted from the original signal by an amount equal to the time of travel of the individual signal from the source of origination to the location of detection. That is to say, a portion of the original signal is reflected at a first sub-surface interface while the rest is propagated deeper into the earth to another interface at which a portion thereof is reflected, and so on, thus producing many reflected signals each travelling different paths of respectively longer distances. Similar considerations are true for refracting layers in the earth, this phenomenon being well recognized in the art of seismology.

The heterodyning and filtering above-described yields a lower sideband comprised of several distinct difference frequencies each corresponding to a distinct time of travel of one of the signals from the source to the location of detection. However, this is a complex composite signal that does not indicate the individual difference frequencies without further processing. An important aspect of the invention is the provision of a frequency spectra of the lower sideband by a Fourier transform of the sideband, which results in amplitude peaks at the respective difference frequencies.

Various sub-surface interfaces not only cause reflection of a portion of the propagated sonic wave but, in some instances, the reflected wave is shifted in phase by an angle depending upon the characteristics of the transmitting medium (earth) on opposite sides of the interfaces. This phase shift, if any, can likewise be determined by means of the Fourier transform of the composite signals as will be described further. The angle of phase shift will depend upon whether the medium at the reflecting interface undergoes only compressional motion, in which case the phase shift is 180°, or undergoes shear motion in addition to compressional motion, in which case the phase shift is less than 180°, or undergoes neither motion, in which case there is no phase shift.

Referring specifically to the figures of the drawing and a discussion of the invention which has prime application to reflection seismic prospecting, there is shown in FIG. 1 a sectional view of several geological sub-surface strata with a seismic signal source and a detector located in spaced relation from each other on the surface of the earth. This view illustrates how a seismic signal is propagated into the earth, and portions of the signal are reflected at the several interfaces located beneath the earth's surface at respective distances of $s_1$, $s_2$, $s_3$, etc. To an approximation, the signal propagates from the source in a spherical pattern, so that the amplitude and intensity of the wave are attenuated as a function of the distance traveled. The earth also attenuates some of the higher frequencies more than the lower frequencies, which is to say that the latter part of the original signal, if the signal frequency is increasing with time, is attenuated more so than the beginning of the signal.

Figure 2:
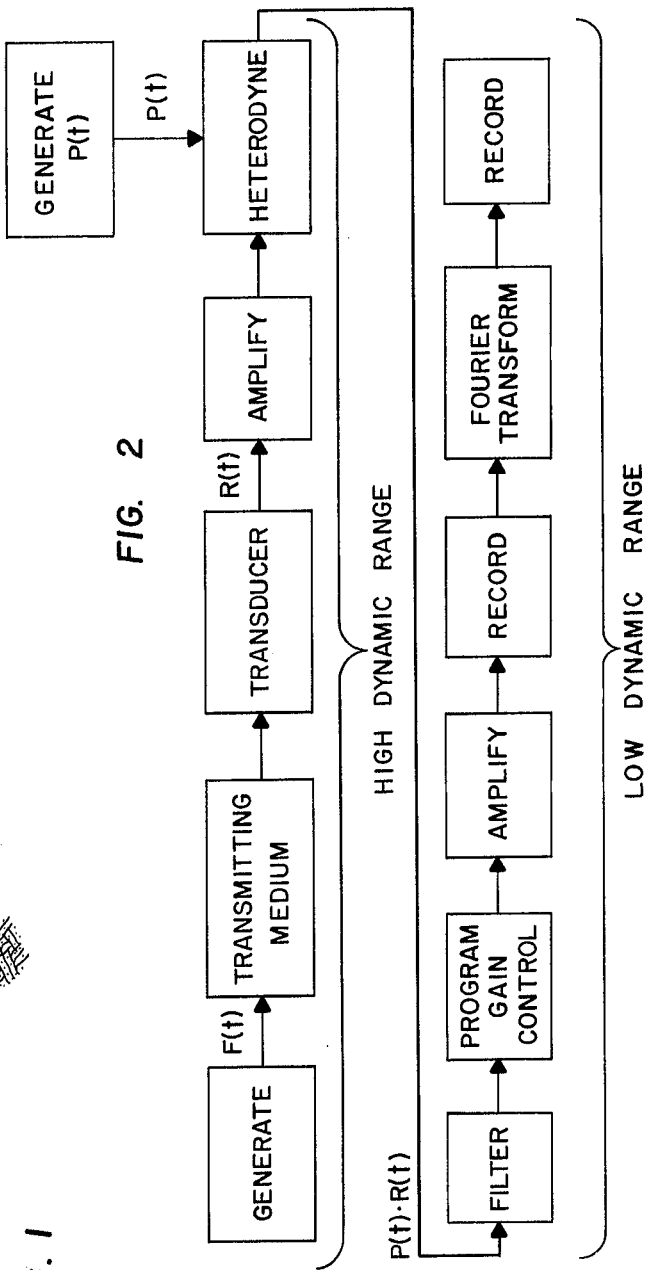
FIG. 2 is a block diagram illustrating the steps of the method of the invention.

Referring now to FIG. 2 there is shown in a block diagram illustrating the sequence of events and process steps for generating a seismic signal and processing the reflected waves to extract useful information. The more preferable seismic signal is one whose frequency increases (or decreases) linearly with time, such as that designated as $F(t)$ in FIG. 3. For clarity, only a linearly increasing frequency with time will be considered, where the frequency at zero time, $f_0$ (time of initiation of the signal into the earth), is some value greater than zero. Certain frequency ranges are more useful than others for seismology work, and as explained previously, the lower frequencies are attenuated to a lesser degree than higher frequencies. Although any frequency range could be used, it has been found that a signal having an initial signal, $f_0$, of about 15 c.p.s. and increasing linearly with time to a maximum frequency of about 120 c.p.s over a period of time of about 15 seconds is suitable for this purpose. Any suitable apparatus for generating a sonic signal of these characteristics is adequate for this purpose, as will be explained hereinafter.

Figure 3:
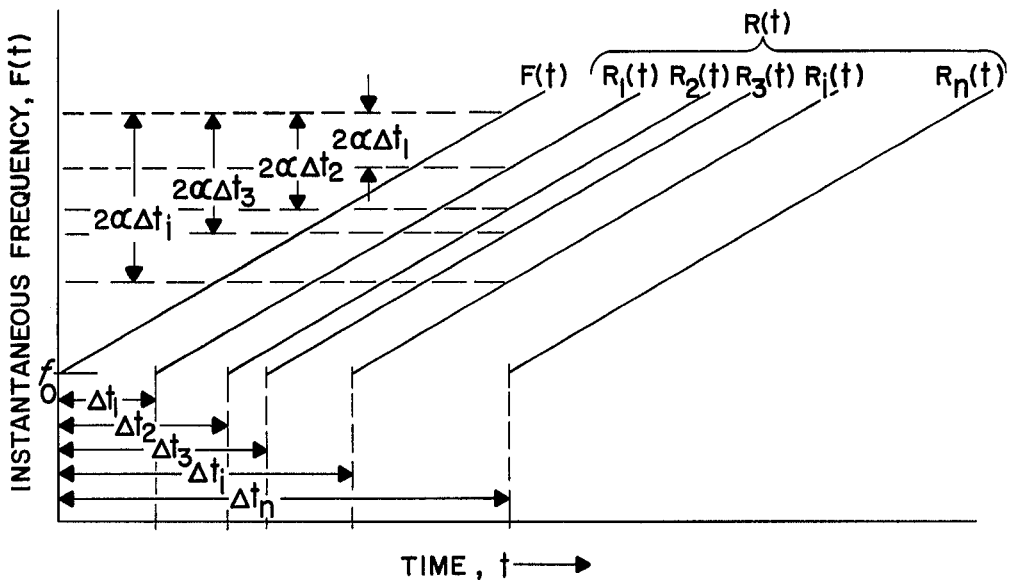
FIG. 3 is a graphical representation of the frequency characteristics as a function of time of a sonic signal travelling in a medium and the several reflected signals arising from the reflection of the sonic signal from a multiple of spaced interfaces in the medium.

From the graph of FIG. 3 it is seen that the seismic signal $F(t)$ can be expressed as (Eq. 1) $\qquad F(t) = A(t) \sin(\omega_0 t + \alpha t^2)$ where $A(t)$ = amplitude as a function of time which, in turn, is a function of frequency, $\omega_0$ = initial frequency $f_0$ multiplied by $2\pi$, $\alpha$ = the slope of the curve $F(t)$ and is equal to the time rate of change of the instantaneous frequency of $F(t)$, which is given by the relation $df(t)/dt$, and $t$ = time.

It should be noted for later considerations that the function $F(t)$ can be written in another form as (Eq. 2) $\qquad F(t) = A(t) \sin \theta$ and that, by definition, the instantaneous frequency $f(t)$ is given by (Eq. 3) $$f(t) = \frac{1}{2\pi} \frac{d\theta}{dt}$$

thus from Eq. 1 above, and $$f(t) = \frac{1}{2\pi} \frac{d}{dt}(\omega_0 t + \alpha t^2)$$

(Eq. 4) $$f(t) = \frac{1}{2\pi}(\omega_0 + 2\alpha t)$$

Referring back to FIG. 1 the signal $F(t)$ is imparted or coupled to the earth and is transmitted to and reflected from the several sub-level strata under consideration. The block designated in FIG. 2 as the transmitting medium is the earth for present considerations, and it has been found that the earth attenuates some frequencies more than others. To ensure that the entire frequency response of any one distinct reflected wave reaching the receiving transducer is flat, the amplitude as a function of time $A(t)$ of the original signal $F(t)$ can be chosen such that (Eq. 5) $\qquad F(\omega)H(\omega) = 1$ where $F(\omega)$ = the frequency response or the relative magnitude of the amplitude of $F(t)$ as a function of frequency or mathematically is the Fourier transform of $F(t)$, and $H(\omega)$ = the relative attenuation factor of the earth as a function of frequency, and is generally designated as the transfer function. It should be noted that the amplitude $A(t)$ does not have to be chosen to satisfy Eq. 5 to satisfy the method of the invention, but is normally so done so that any one reflected signal upon reaching the detector has an approximately constant amplitude over its entire frequency range.

As an example of the manner in which the frequency response of the original signal is chosen to satisfy Eq. 5 as closely as possible, a synthetic seismogram can be used to compute what the frequency response of $F(t)$ should be, and the amplitude $A(t)$ is set accordingly.

In connection with Eq. 5 it should also be noted that the amplitude of one distinct reflected wave will be different from the amplitude of any other reflected wave at the detector, since each distinct reflected wave travels a different distance through the earth and is attenuated accordingly. The optional equalization of these will be discussed hereinafter.

Figure 4:
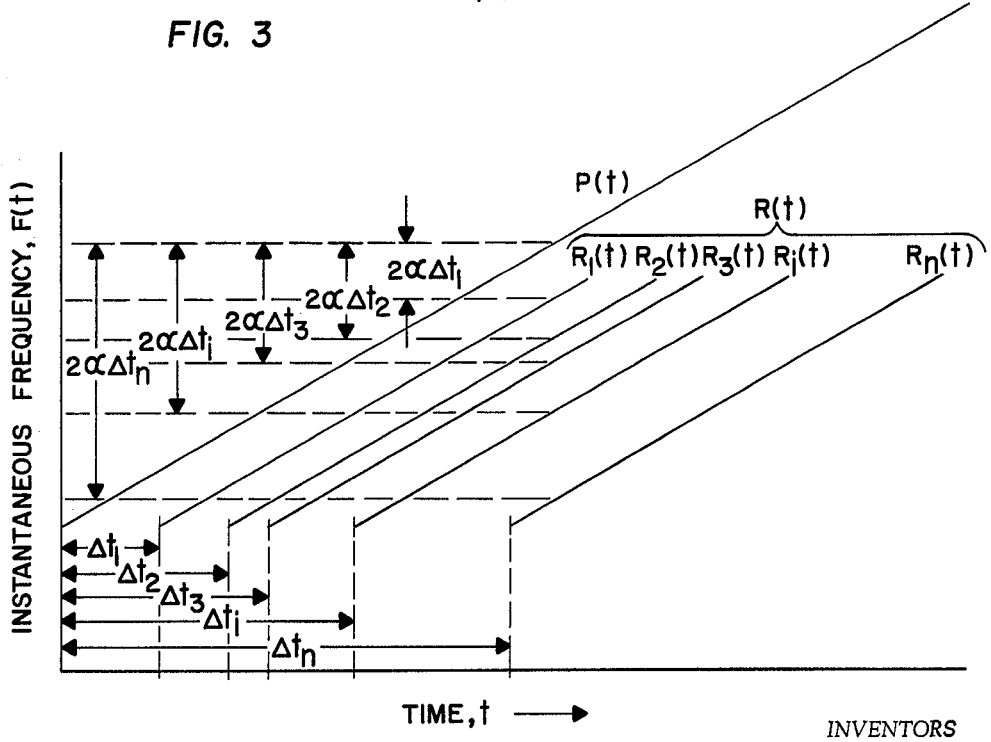
FIG. 4 is a graphical representation of the frequency characteristics as a function of time of the several reflected signals shown in FIG. 3 and a signal function identical to the sonic signal shown in FIG. 3 but of longer duration.

The detector receives a signal for each reflected wave, and the output of the transducer is a composite signal on a time basis of all of the reflected waves. Referring again to FIG. 3, the first reflected wave that reaches the detector travels the shortest distance from the source to the detector and is represented in the figure as $R_1(t)$. This signal is identical to the original signal $F(t)$ insofar as the rate of change of frequency with time and the upper and lower frequency limits, but is shifted in time by an increment equal to the travel time, the time shift being designated as $\Delta t_1$. Likewise, the next reflected signal $R_2(t)$ reaches the transducer at a time $\Delta t_2$, the $i$th signal $R_i(t)$ reaches the transducer at a time $\Delta t_i$, and so forth for $n$ reflected signals. Thus the output $R(t)$ of the transducer can be represented by the expression (Eq. 6) $\quad R(t) = A_1 \sin [\omega_0 + \alpha(t-\Delta t_1)][t-\Delta t_1] + \ldots$
$\quad\quad + A_i \sin [\omega_0 + \alpha(t-\Delta t_i)][t-\Delta t_i] +$
$\quad\quad \ldots + A_n \sin [\omega_0 + \alpha(t-\Delta t_n)][t-\Delta t_n] + N(t)$ or $$R(t) = \sum_{i=1}^{n} A_i \sin \theta_i + N(t)$$

where each term exists for $\Delta t_i \leq t \leq T + \Delta t_i$, T being defined as the period of the $i$th reflected signal. In Eq. 6, $A_1, A_2 \ldots A_i \ldots A_n$ = amplitudes of the respective reflected waves $R_1(t), R_2(t), \ldots R_i(t) \ldots R_n(t)$, $$\frac{1}{2\pi} \frac{d}{dt}[\omega_0 + \alpha(t-\Delta t_i)][t-\Delta t_i] = f_i(t)$$

the instantaneous frequency of the $i$th reflected wave, $$\theta_i = \omega_0(t-\Delta t_i) + \alpha(t-\Delta t_i)^2$$

and $N(t)$ = all noise of all frequencies received by the transducer. Thus the instantaneous frequency $f_i(t)$ of the $i$th reflected wave is given by (Eq. 7) $\quad f_i(t) = \frac{1}{2\pi}(\omega_0 - 2\alpha\Delta t_i + 2\alpha t)$ As will be seen from FIG. 2, the output signals from the transducer are amplified and then heterodyned with a signal $P(t)$ that is identical with the original signal $F(t)$ insofar as its frequency variation as a function of time and the time that it is initiated. The signal $P(t)$ differs from $F(t)$, however, in that $P(t)$ may have a constant amplitude throughout its frequency range, and the duration of $P(t)$ is sufficiently long so that the entire frequency range of every reflected signal is heterodyned thereby. The signal $P(t)$ is shown graphically in FIG. 4 and the time duration thereof is seen to be sufficiently long to extend beyond the duration of the period of the last arriving signal, $R_n(t)$. Thus, the signal $P(t)$ is initiated at the same instant as the original signal $F(t)$, and has a period whose minimum duration is equal to the period of $F(t)$ plus the longest travel time $\Delta t_n$ of any of the reflected signals, this is desirable, since the reflected signal having the longest travel time is the signal most attenuated and of least energy, and in order to achieve a strong output and high resolution for all reflections, it is necessary to take advantage of as much reflected energy of the latest arriving signals as possible. Thus by ensuring the above-prescribed period for $P(t)$, all of the energy of the last received signal will be used in the heterodyning process. It is, of course, possible to heterodyne the output $R(t)$ of the detector with the original signal $F(t)$, although the resolution of the latter arriving signals would be decreased.

Heterodyning the reflected signals $R(t)$ with the signal $P(t)$ yields a composite signal comprised of an upper and a lower sideband, the upper sideband of which is comprised of components whose instantaneous frequencies are the additions of the instantaneous frequency of $P(t)$ and the respective instantaneous frequencies of the components of $R(t)$ and, the lower sideband of which is comprised of components whose instantaneous frequencies are the differences of the instantaneous frequencies of the respective components of $R(t)$ and the instantaneous frequency of $P(t)$. The resulting composite signal comprising both the upper and lower sidebands can be expressed as (Eq. 8)

$$P(t) \cdot R(t) = A \sin \theta \sum_{i=1}^{n} A_i \sin \theta_i + A \sin \theta N(t)$$

or $$P(t) \cdot R(t) =$$
$$\sum_{i=1}^{n} A A_i \left[\frac{1}{2}\cos(\theta-\theta_i) - \frac{1}{2}\cos(\theta+\theta_i)\right] + A \sin \theta N(t)$$

since the multiplication produces the upper and lower sidebands as previously described.

The lower sideband components are of constant frequency since they are the difference in frequencies between two signals each increasing with time linearly and at the same rate. The frequency of the $i$th component of the lower sideband is then given by (Eq. 9)

$$f(t) - f_i(t) = \frac{1}{2\pi}\cdot(2\alpha\Delta t_i) = \frac{\omega_i}{2\pi}$$

where $\omega_i$ is the frequency of the $i$th component multiplied by $2\pi$.

Figure 5:
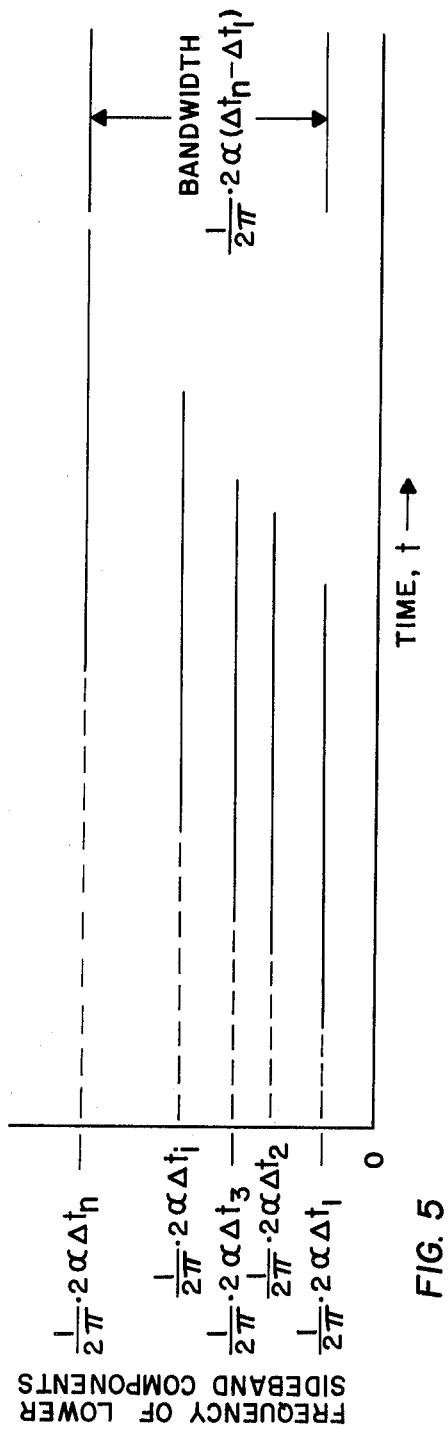
FIG. 5 is a graphical representation of a set of signals corresponding, respectively, to the difference frequencies between the longer duration sonic signal and the reflected signals shown in FIG. 4.

The upper sideband components are now filtered from the heterodyned signals since they are unnecessary, and the lower sideband components are equalized in amplitude to reduce the dynamic range for recording as alluded to previously. The components of the lower sideband are shown graphically in FIG. 5 with the low dynamic range bandwidth being the difference in frequency between the highest and lowest frequency components, or $$\frac{1}{2\pi}2\alpha(\Delta t_n - \Delta t_1)$$

It will also be noted that each component is of constant frequency.

A filter is used to block the upper sideband components and pass only the lower sideband components, and any suitable low pass filter that has a frequency cut-off at a predetermined maximum frequency can be used. There can be provided a filter the cut-off frequency of which can be adjusted to a value intermediate the highest frequency lower sideband component and the lowest frequency in the upper sideband, so that the same filter can be used where the frequencies of lower sideband components vary from one geological location to another. Alternatively, multiple low pass filters each having a different cut-off frequency can be decaded for switching from one to another to provide the required versatility.

The lower sideband components are now equalized in amplitude or the amplitudes thereof are more nearly equalized, to provide the low dynamic range. This operation can be accomplished by a passive network similar to that used in preemphasis in the H-F portion of an audio spectrum in a receiver. For example, two such circuits, one a simple R-L circuit and the other a simple C-R circuit, are shown in Seely, S., Electron-Tube Circuits, McGraw-Hill Book Company, Inc., 2nd Edition (1958), p. 615. Other and more sophisticated passive circuits can be used, if necessary, to provide a more complex frequency response, and these are well known in the art. The frequency response of this network is chosen according to the attenuation on the various received signals by the medium. However, the earth's normal attenuation on the signals is a function of the distance traveled by the signal in the earth, namely, the amplitude of the signal decreases in proportion to the square of the distance traveled. Since the frequency of any lower sideband component is directly proportional to the distance traveled (assuming constant velocity in the earth and the attenuation factor above-noted), the amplitude of a lower sideband component is inversely proportional to the square of its frequency. Thus, frequency response of the passive network is chosen according to the last-mentioned relation to provide equal amplitude for all lower sideband components. A network having adjustable components or several fixed networks each having a different frequency response can be connected in decade to provide versatility of the system for different geological locations to take into account the different attenuation characteristics of the earth at these locations.

After the preemphasis operation, the components can be amplified, if desired, by any suitable means that has a constant amplification factor for the frequency band covered by the compenents. Thus all signals are of approximately equal amplitude and of any desired magnitude.

The passive network and its operation on the lower sideband components is referred to hereinafter as program gain control, and in this system, it is synonymous with preemphasis as noted earlier. This is an important feature of this system and should be distinguished from automatic gain control and other types of program gain control used in seismic equipment. One of the important features that makes possible the use of a passive network to effect preemphasis is the previous operation of heterodyning the complex signal with another signal to provide constant frequency lower sideband components. Preemphasis in this manner cannot be accomplished, however, previous to heterodyning, since a single frequency is not representative of a single reflected signal. Heretofore, other systems provided amplification of the received signals, but the equipment required to provide an amplifier whose response could be controlled, proved elaborate and expensive. In addition, the amplification as a function of time of these systems is usually recorded to provide information to the person interpreting the recorded seismic data. In the program gain control of this invention, however, the response is known or can be calculated from the components in the preemphasis-network, and thus the response is readily known to the interpreter. Moreover, much less sophisticated equipment is required and the expense is greatly reduced as compared to other systems.

The composite output signal from the gain control network (preemphasis) is amplified, if desired, and recorded, as shown in the block diagram of FIG. 2, and subsequently, the frequency spectrum is determined by taking the Fourier transform. The output signal $R'(t)$ from the preemphasis network, which is the function $P(t) \cdot R(t)$ of Eq. 8 after filtering and preemphasis, can be expressed as (Eq. 10)
$$R'(t) = \sum_{i=1}^{n} \frac{1}{2} A A_i \cos(\theta - \theta_i) + N'(t)$$

where
$N'(t)$ is the heterodyned, lower sideband filter noise remaining.

From Eqs. 2, 6 and 9, (Eq. 11)
$$R'(t) = \sum_{i=1}^{n} \frac{1}{2} A A_i \cos(\omega_i t + \phi_i) + N'(t)$$

where $\phi_i$ = phase of the $i$th lower sideband component. Transforming this function to the frequency domain yields a frequency response function for the lower sideband components expressed as (Eq. 12)
$$R'(f) = \sum_{i=1}^{n} \frac{1}{2} A A_i \cdot \delta\left(\frac{2\alpha \Delta t_i}{2\pi}\right) \cdot e^{j\phi_i}$$

where
$$\delta\left(\frac{2\alpha \Delta t_i}{2\pi}\right) = 1 \text{ for } f = \frac{2\alpha \Delta t_i}{2\pi}$$

and
$$\delta\left(\frac{2\alpha \Delta t_i}{2\pi}\right) = 0 \text{ for } f \neq \frac{2\alpha \Delta t_i}{2\pi}$$

Equation 12 can be rewritten as (Eq. 13)
$$R'(f) = \sum_{i=1}^{n} \frac{1}{2} A A_i \cdot \delta(f_i) \cdot e^{j\phi_i}$$

where
$f_i$ = frequency of the $i$th lower sideband component,
and
$\phi_i$ = phase of $i$th lower sideband component.

Figure 6:
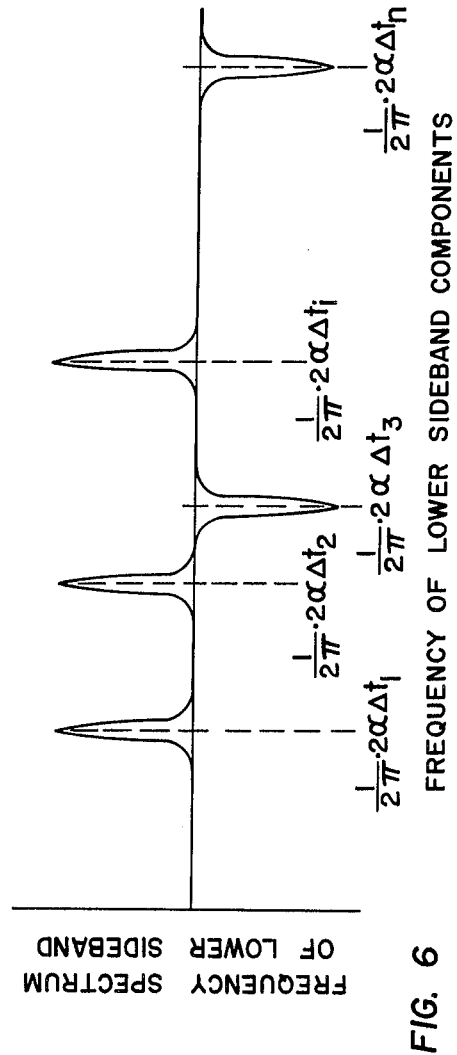
FIG. 6 is a graphical illustration of the interpretable record provided by the invention.

When the frequency response according to Eq. 13 is determined by analogue or digital means as hereinafter described, a frequency response can be recorded as shown in FIG. 6, where the response is zero except at the lower sideband component frequencies $$f_i = \frac{1}{2\pi}(2\alpha \Delta t_i)$$

where $\Delta t_i$ is the travel time. At these frequencies the spectrum indicates peaks, as shown, where for purposes of illustration, some of the peaks are shown at a phase of 180° to other peaks, the respective phases being indicated by positive and negative values.

The phase $\phi_i$ of the $i$th lower sideband component is that resulting from the travel time of the $i$th reflected signal from the source to the point of detection. There are in addition to this phase, two other sources that can impart phase to the component, and these are the phase $\phi_R$ imparted by the reflecting interface and the phase $\phi_F$ imparted by the low pass filter and the preemphasis network. Thus the total phase $\phi_T$ can be expressed as (Eq. 14) $\phi_T = \phi_i + \phi_R + \phi_F$ The only phase of interest is $\phi_R$, which gives information to the interpreter of the seismic records regarding the characteristics of the particular reflecting interfaces, such as whether or not the interface undergoes shear motion, compressional motion, or both. It should be noted that Eq. 13 is a mathematical expression for the frequency spectrum of the lower sideband components, but when the output from the preemphasis network is processed by analogue or digital means to determine the frequency response, as hereinafter described, the phase associated with the $i$th component is the total phase. The travel time $\Delta t_i$ is known from the frequency spectrum as shown in FIG. 6, and thus the phase $\phi_i$ can be directly computed. Likewise, the phase $\phi_F$ can be directly computed from the magnitudes of the components of the low pass filter and the preemphasis network. Thus the phase $\phi_R$ is known, or may be computed.

As shown in FIG. 6, only components the phase of which are zero or 180° are shown. In practice, however, the phase can have any value, and if it differs from 0° and 180°, it is more readily recorded in digital form than in analogue form. This can be done by means of a digital computer, described hereinafter.

Any suitable means can be used to carry out the method of the invention, and illustrative apparatus for successfully carrying out the method will now be described. Any apparatus that is suitable for imparting to the earth an elastic sound wave having the characteristics of the desired input signal is sufficient. For example, the apparatus described in the U.S. patent to Albert L. Wade, entitled Method and Apparatus for Creating a Seismic Source, 3,106,982, issued October 15, 1963, and assigned to the common assignee, can be used as the seismic source for generating elastic waves. However, any other electromechanical transducer for imparting vibratory motion to the earth can be used. It has also been found that using a seismic source having an initial frequency of 15 c.p.s. and linearly increasing in frequency to 120 c.p.s. over a period of 15 seconds is suitable for most seismic work, although other frequency ranges may be used. The lower frequencies are not attenuated by the earth to the degree that are higher frequencies, and thus the above frequency range provides signals with a minimum of energy loss.

The traveling signals are received and detected by any standard geophone used in seismic work, or any other suitable mechanical to electrical transducer will suffice. The electrical output from the geophone is then amplified to increase the amplitude by any suitable means. The degree of amplification depends upon, of course, the degree to which the signals are attenuated. Normally, the signals are then recorded on magnetic tape in digital form, which can be performed by any suitable analogue-to-digital converter coupled to a digital recorder. The further processing of the recorded information can then be carried out entirely with a computer of the type described in the U.S. patent to George T. Baker et al., entitled Digital Computer With Simultaneous Internal Data Transfer, 3,074,636, issued January 22, 1963, and assigned to the common assignee. Here, the recorded data is supplied in digital form to the computer and all heterodyning, filtering, preemphasis, transforming and determination of phases of the lower sideband components into a frequency spectrum in digital form is carried out by the computer.

The foregoing operations are carried out substantially as follows: the computer is capable of generating in digital form the desired signal to be used to actuate the vibrator source. Although the frequency of the signal increases linearly with time, the amplitude as a function of frequency may not be such as can be represented by an analytical equation. As shown in Eq. 5, supra, the amplitude function is chosen such that each reflected wave reaching the seismometer has, as nearly as possible, a flat frequency response. To compute the amplitude function of the initial signal, a synthetic seismogram can be used to approximate the attenuation characteristics of the earth at the particular geographical location of interest, the computer is programmed accordingly, and the amplitude function that will give flat frequency responses for all reflected signals is generated in digital form. This is then converted to analogue form and fed into the vibratory source for generating the actual signal in the earth.

As stated before, the generation of the optimum amplitude function is optional, and if a simplified approach is desired, a constant amplitude function can be used. In such case, any suitable analogue generator whose output has a constant amplitude and has a frequency that increases linearly with time is coupled directly into the vibrator source.

The recording of the reflected waves is begun simultaneously with the initiation of the original signal in the earth, and the original signal is also recorded on the same seismogram with the reflected signals. Due to the respective travel times of the reflected signals, there will be time delays on the seismogram between the original signal and the reflected signals. In order to take advantage of as much of the reflected energy as possible, it is necessary to continue the recording of the original signal for a time duration that extends as long as, or beyond, the duration of the last reflected signal. This is accomplished by actuating the vibratory source with the original signal for a predetermined period of time, discontinuing the actuation of the vibrator, but continuing the original signal and its recording on the seismogram until the last reflected signal has been completely recorded. Thus, in effect, there is provided an initial signal $F(t)$ according to the equation above, and a signal $P(t)$ identical to $F(t)$ but of longer duration.

The seismogram is then converted to digital form by any suitable analogue-to-digital converter, and then fed into the programmed computer. The computer heterodynes the signal $P(t)$ recorded on the seismogram with each of the reflected signals recorded thereon. Since all of these signals are recorded in the proper time sequence, the computer is then capable of heterodying them in the proper sequence. The other functions, such as filtering, preemphasis, amplification, transformation and phase determination are performed as a result of programming.

A suitable digital-to-analogue converter is then used in conjunction with a recorder to display the frequency spectrum, or the results from the frequency spectrum can be extracted directly from the computer in digital form.

If it is deemed desirable to perform all phases of the method in the field with the exception of the transformation of the filtered signal to provide a frequency spectrum, the signal derived from the geophone (seismometer) is amplified, and then directly heterodyned with a suitable electrical network, such as a four-quadrant multiplier. Here, the initial analogue signal is coupled to the four-quadrant multiplier to supply the heterodyning signal $P(t)$. Any suitable low pass filter, such as an L-C network, is then used to block the upper sideband components of the signal, and a preemphasis network as above-described can be used to reduce the dynamic range of the lower sideband by equalizing the amplitude of the components thereof. The bandwidth (now only lower sideband) and the dynamic range of the signal are now such that simple analogue equipment can be used to record the information. The recording is then processed through the computer to perform the transformation and phase determination. As mentioned above in connection with Equation 13, the Fourier transform calculation may be performed by analog circuitry if desired. Circuitry for the analog computation of the Fourier transform is shown in Electronic Engineering, February 1951, pages 67–69 and Electronics, November 1949, pages 106–110, at page 107. The device in Electronic Engineering produces in analog form the Fourier sine and cosine transforms of an input waveform; while the Electronics article shows a circuit for converting the sine and cosine transforms to a Fourier amplitude and phase spectrum. Further analog means for producing the desired Fourier transform spectrum are indicated in U.S. Patent 2,696,891, issued December 14, 1954, to J. Neufeld, at column 17, line 17 through column 18, line 19, including a harmonic analyzer disclosed in U.S. Patent No. 2,098,326, issued November 9, 1937, to E. C. Wente and cited in said Neufeld patent at column 18, line 15.

Since the method described above provides a spectrum in terms of the frequency difference between the original signal and the reflected waves, this spectrum is also indicative of the time of travel of each reflected wave. By knowing or assuming the velocity of the wave in the medium (the manner for so determining being well-known in reflection and refraction seismology), the depths from the earth's surface of the reflecting or refracting interfaces can be determined. Because of the knowledge of the phase relation of the reflected waves, information concerning the nature and character of the reflecting interface is available.

Although the present invention has been described with reference to a detailed embodiment thereof in connection with its application to seismology, it should be understood that modifications and substitutions, including its application to other fields of the technology, will become apparent to those skilled in the art, wherein these modifications and substitutions do not depart from the invention as defined in the appended claims.

What is claimed is:

1. A method of determining the travel times between spaced first and second points in a medium, of multiple signals each originating simultaneously at said first point and derived from a first single source signal and each having a different travel time between said first and said second points, said source signal having a linearly increasing frequency with time over its period of duration, comprising:
    (a) originating said source signal in said medium at said first point,
    (b) determining the frequency variation of the attenuation by said medium of signals originated therein and amplitude modulating said source signal to have increased amplitude at frequencies subject to increased attenuation by said medium,
    (c) receiving said multiple signals at said second point,
    (d) amplifying said received multiple signals,
    (e) providing a second signal initiated simultaneously with said source signal, the frequency as a function of time of which is identical to said source signal and the period of duration of which is at least as long as that of said source signal plus the longest travel time of said multiple signals,
    (f) heterodyning said amplified signals with said second signal to provide a complex signal comprised of an upper sideband and a lower sideband, the lower sideband of which is comprised of a distinct and substantially constant frequency component for each of said received signals,
    (g) filtering said complex signal to remove said upper sideband and leave intact said lower sideband,
    (h) preemphasizing said filtered signal to provide low dynamic amplitude range of said components,
    (i) amplifying said preemphasized signal, and
    (j) transforming said preemphasied lower sideband to provide a frequency spectrum thereof including an amplitude spectrum and a phase spectrum,
    (k) whereby response maxima of said amplitude spectrum are indicative of the respective travel times of said multiple signals and the values in said phase spectrum corresponding to said maxima indicate signal forming characteristics of the structure giving rise to said multiple signals in said medium.

2. A method according to claim 1, wherein said preemphasizing includes the step of attenuating said components by a factor approximately inversely proportional to the square of the frequency of said component.

References Cited by the Examiner

UNITED STATES PATENTS

| 2,696,891 | 12/1954 | Neufeld | 340—15.5 |
| 2,754,492 | 7/1956 | Parker | 340—3 |
| 2,977,568 | 3/1961 | Roshon et al. | 343—14 |
| 3,016,513 | 1/1962 | Van Dyke | 340—3 |
| 3,158,830 | 11/1964 | Clay | 340—3 |

OTHER REFERENCES

Seely, Samuel; Electron-Tube Circuits, 2nd edition, McGraw-Hill Book Company, 1958, pages 615–616 (section 19–9) relied on.

BENJAMIN A. BORCHELT, *Primary Examiner.*

CHESTER L. JUSTUS, SAMUEL FEINBERG,
*Examiners.*

R. M. SKOLNIK, W. KUJAWA, *Assistant Examiners*